United States Patent

[11] 3,624,248

[72] Inventors John Eugene Santo
West New York;
Jan Edmond Vandegaer, Wayne, both of N.J.
[21] Appl. No. 403
[22] Filed Jan. 6, 1970
[45] Patented Nov. 30, 1971
[73] Assignee Pennwalt Corporation
Original application Mar. 7, 1967, Ser. No. 621,135, now Patent No. 3,492,380.
Divided and this application Jan. 6, 1970, Ser. No. 403

[54] NEW PHOSPHORUS-CONTAINING POLYMERS AND THE PROCESS OF MAKING SAID POLYMERS
4 Claims, No Drawings
[52] U.S. Cl. .................................................. 260/47 CZ,
117/100 A, 260/47 C, 260/47 CB, 260/47 P, 264/4
[51] Int. Cl. .................................................. C08g 20/34
[50] Field of Search .......................................... 260/47 P, 47 CZ

[56] References Cited
UNITED STATES PATENTS
2,952,666   9/1960   Coover et al. ................   260/77.5
3,491,061   1/1970   Millich ..........................   260/47

FOREIGN PATENTS
807,851    1/1959    Great Britain ..............
991,018    5/1965    Great Britain ..............
125,566    1/1960    U.S.S.R. ........................
687,564    5/1964    Canada ........................
633,827   12/1963    Belgium ......................

OTHER REFERENCES
Wright et al., Chem. & Ind. 1952, 244
Shuto, Kogyo Kogaku Zasshi 67, 380– 384 (1964)

*Primary Examiner*—Melvin Goldstein
*Attorneys*—Carl A. Hechmer, Jr. and Stanley Litz ABSTRACT: Liquid or solid particles are encapsulated with a shell of solid polymeric material having phosphorus as a part of the backbone by an interfacial polycondensation reaction between a fast reacting reactant, such as hexamethylene diamine, and an arene having as substituents—COX and/or —OPOX$_2$, at least one —OPOX$_2$, such as p-(chlorocarbonyl)-phenyldichlorophosphate. Other polyfunctional reactants, such as diethylene triamine and polymethylene polyphenylisocyanate, are desirably present.

NEW PHOSPHORUS-CONTAINING POLYMERS AND THE PROCESS OF MAKING SAID POLYMERS

This application is a division of Ser. No. 621,135, filed Mar. 7, 1967, now U.S. Pat. No. 3,492,380.

BACKGROUND OF THE invention

This invention relates to interfacial polycondensation, polymers formed thereby and to a process for encapsulating liquid or solid particles using interfacial polycondensation to form a polymeric shell about such particles.

The interfacial polycondensation reaction for forming polymers is well known. The reactants and reaction conditions are set out in detail in U.S. Pat. No. 2,708,617, granted May 17, 1955, by P. W. Morgan, "Low-Temperature Polycondensation Processes" p. 191 of Polymerization and Polycondensation Processes (A.C.S. Advances in Chemistry Series 34 [1962]). The classes of polymers obtainable from this polycondensation reaction are: amide, carbonate, ester, phosphonamide, sulfonamide, sulfonate, urea and urethane (Morgan, p. 193).

The interfacial polycondensation reaction has been used to encapsulate liquids and solid particles by causing the reaction to take place at the surface of the particle which in effect, acts as the interface. Typical art teachings on the encapsulation procedures are presented in U.S. Pat. No. 3,270,100, granted Aug. 30, 1966, British specification No. 950,443, published Feb. 26, 1964, British specification No. 1,046,409 published Oct. 26, 1966 and Belgium Pat. No. 657,013, granted June 11, 1965. [The Belgium patent corresponds to U.S. application, Ser. No. 330,255, filed Dec. 13, 1963 for Jan. E. Vandegaer.]

The teachings of the U.S. application, Ser. No. 330,255 are incorporated herein by reference.

An encapsulated "payload" must be recoverable. For many purposes, it is sufficient to rupture the shell by applying force thereto, e.g., the typewriter typeface against "no-carbon" paper coated with ink containing capsules. In other cases, the shell is made of material which will permit the payload to diffuse through the shell and become available. For some purposes, solubility of the shell material in a certain solvent is used to release the payload. For some uses it is necessary that the shell resist one type of solvent with which it makes contact and then be dissolved by a subsequent solvent. Orally given medicinal capsules intended for release in the intestines must resist stomach acid and soften or even dissolve in the alkaline liquid in the intestine.

The general object of this invention is to provide a novel interfacial polycondensation polymer and specifically one which is resistant to acid pH but dissolves at alkaline pH.

The specific object of this invention is a process for encapsulation of particles which utilizes an interfacial polycondensation polymer as the shell.

Other objects will be apparent from the description of the invention.

SUMMARY OF THE INVENTION

Broadly, the polymer process of the invention comprises reacting at interfacial polymerization conditions a compound of the formula

I.

$$Z \begin{matrix} -(R_1)n \\ (R_2)-m \end{matrix}$$

where (a) Z is an arene (carbocyclic) nucleus;

(b) $R_1$ is the radical $$-O-\underset{X}{\overset{X}{\underset{|}{P}}}-O$$

(c) $R_2$ is a radical selected from the class consisting of $$-O-\underset{X}{\overset{X}{\underset{|}{P}}}-O \text{ and } -(CH_2)_w-COX$$

d. X if F, CL. or Br;

e. $m$ and $n$ are each an integer equal to at least 1;

f. $w$ is an integer equal to 0–6; and g. when $m$ and $n$ are each equal to 1 and the R's are on the same benzene ring, then R1 and R2 are separated by at least one ring carbon atom and II. a fast-reacting organic intermediate capable of condensing therewith to form a solid polymer.

The encapsulation process comprises reacting compounds I and II at the surface of a liquid or solid particle, under interfacial polycondensation conditions, to form a solid polymeric shell enclosing the particle.

DESCRIPTION OF THE INVENTION AND EMBODIMENTS

It is to be understood that "Z" may be any arene (carbocyclic) nucleus. Illustrative nuclei are:

(III) benzene:

(IV) polyphenyl:

(V) polyphenylalkane: where $R'$ is alkylene (VI) polynuclear arene:

The nucleus is substituted with at least one radical $-O-POX_2$, $[R_1]$, and also with at least one radical $[R_2]$ which may be $[R_1]$ or $-(CH_2)w-COX$. In the case of a "poly" nucleus the substituents may be positioned only on one ring (i.e., the same) or may be positioned on different rings. However when only one $R_1$ and one $R_2$ are present and these are positioned on the same "benzene" ring, R1 and R2 must be separated by at least one ring carbon atom, i.e., the two R's must be at least meta oriented with respect to each other. It is preferred that the compound I should include both $-OPOX_2$ and $-COX$ groups. Also it is preferred that "X" be chloro or bromo and "$m$ and $n$" each be equal to 1.

The polymer made using compound I is characterized by having phosphorus as a part of the polymeric backbone.

It is to be understood that one or more of the diacid halides used in interfacial polycondensations may be used in conjunction with a [I] compound.

The other reactant may be any organic intermediate having at least two functional groups capable of reacting with diacid halide at interfacial polycondensation conditions, which may be referred to OH reactants. In general these other reactants are organic primary or secondary amines (including amides), thiols, and hydroxyaryl compounds. These may also be defined as organic compounds having two or more functional groups selected from the class consisting of amino, $-NHR_3$ where $R_3$ is H, alkyl or alkylene; phenolic, $-OH$, and thiolic, $-SH$.

Although satisfactory polymers are formed by the reaction of two difunctional reactants, for encapsulation shells it is preferred that some amount of a trifunctional, or higher, reactant also be present, such as alkylene tri- and tetraamines, and aromatic polyisocyanates. For special polymer shell properties a number of "acidic reactants" and a number of "OH reactants" may form the total polycondensation reaction mixture.

In general, the polycondensation reaction is carried at low or moderate temperatures, usually below about 100° C. and in the presence of an acid acceptor to react with the HX released (this is not essential). Although the polycondensation can proceed directly, it is usual to operate in the presence of inert solvents for one or all the reactants; the polymer must be insoluble in the solvent(s) present.

The polymer of the invention may be formed as a thin flat film or tubular film or as granules by procedures now used in this art.

For encapsulation the particle to be encapsulated, which may be a liquid, solid, or gas, is coated with the polymer shell by forming a dispersion of the particles, including one of the defined intermediates, in a liquid containing the other of said defined intermediates. The particle coating is carried out at conventional interfacial polycondensation conditions. Typical conditions are given in the working examples below.

EXAMPLES

Synthesis of p-(chlorocarbonyl)-phenyl-dichlorophosphate—[DCP]

For convenience the reaction is set out as though two independent steps take place, even though this is only a postulate.

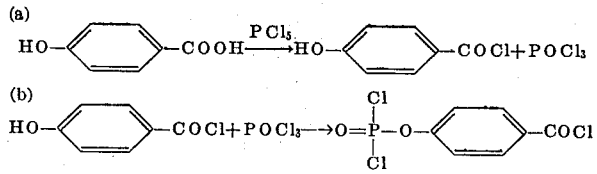

p-Hydroxybenzoic acid (276.2 g.) and phosphorous pentachloride (625 g.) were charged to a three-neck flask equipped with a reflux condenser. The mixture was heated to 120° C. and kept at this temperature for 2 hours. After this time, the temperature was raised to 190° C. (pot) and byproducts were distilled over. The residue was extracted with methylcyclohexane and the extract was concentrated. The concentrate was vacuum distilled. The main cut was taken at 166° C. at 8 mm.

|  | Calc. | Found |
|---|---|---|
| Chlorine | 38.89 | 40.20 |
| Phosphorous | 11.33 | 10.75 |

EXAMPLE 1

3.0 g. of DCP from synthesis A was dissolved in benzene. The stochiometric amount of hexamethylenediamine, 1.27 g., was dissolved in water. The benzene solution was carefully poured on top of the water solution, forming two layers. A thin film of solid polymer formed at the interface and was withdrawn from the beaker slowly. The reactant solutions were at room temperature, about 25° C. The polymer was washed with a small amount of water and dried under vacuum. The dry product was powderized.

The polymer was insoluble, at room temperature, in ether, benzene, toluene, tetrahydrofuran, dimethylformamide and dimethyl sulfoxide. The polymer was soluble in ethanol, isopropanol and water.

EXAMPLE 2 a. 5.0 g. of DCP was dissolved in 5 ml. of benzene. 3.1 g. of hexamethylenediamine was dissolved in 200 ml. of water. The water solution was placed in a Waring blender and agitation started. The DCP-benzene solution was added and agitation continued for a few minutes. A solid appeared. The solid was filtered off from the liquid; the filter cake was washed with ether. The capsules forming the filter cake were placed in a vacuum oven. Under the vacuum the shells ruptured—about 50 ml. of water was recovered from the dish containing the capsules.

b. The stability of the polymer shells of capsules made according to the procedure of 2a was studied in aqueous solutions of different pH's. The time needed for a visual change in the capsules was noted.

| Test | pH | Observation |
|---|---|---|
| 1. | 1 | No change in 15 minutes |
| 2. | 4 | No change in 15 minutes |
| 3. | 7 | Burst at 12 minutes |
| 4. | 8 | Burst at 2 minutes |
| 5. | 9 | Burst at 2 minutes |
| 6. | 10 | Burst at 2 minutes |

This establishes the value of this polymer for use as a pH-dependent-release shell.

EXAMPLE 3

Encapsulation of Thimet insecticide

Into a resin flask there was charged 500 ml. Elvanol 50–42 (a polyvinyl alcohol). There was then charged 30 g. of Thimet (91 percent); 2 g. of sebacoyl chloride; 2 g. of DCP; and 7 g. of PAPI (polymethylene polyphenylisocyanate having about 3 functional groups). The contents of the flask were agitated while there was added: 5 g. of ethylenediamine, 5 g. of diethylenetriamine; 5 g. of sodium carbonate—all in 50 ml. of water. The contents of the flask were agitated for 3 hr. at about 25° C. The solids formed in the flask were filtered off and air dried in a hood overnight. 37.4 g. of Thimet payload capsules having a size range of 300–600 microns were obtained.

EXAMPLE 4

4.3 g. of piperazine were dissolved in water. A solution of 13.6 g. of DCP in 30 ml. of benzene was carefully poured on top of the water solution to form two layers. A thin film of polymer formed at the interface and was withdrawn continuously at a slow rate.

EXAMPLE 5 a. A phosphorous containing derivative of Bisphenol-A,[2,2-bis-(4-hydroxy-phenyl)-propane]-bisdichlorophosphate was prepared.

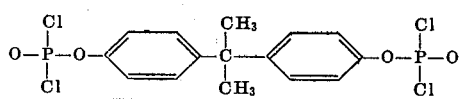

Bisphenol-A (102.6 g.) was added to POCl₃ (270 ml.) under stirring. PCl₃ (3.0 ml.) was added and the reaction mixture was stirred vigorously and heated to 95° C. under an atmosphere of nitrogen. Total time required for the reaction was 120 hrs. The reaction mixture was mixed with petroleum ether (BP ≈ 35° C.) and the oily phase was separated. This oil was dissolved in 3 liters of petroleum ether (BP≈ 120° C.) under reflux. Compound 5 crystallized out from the solution. MP 65° – 67° C. Yield 43 percent.

b. Diazinon was encapsulated using compound 5 using the procedure of example 3.

Charge:
60.0 g. Diazinon
10.0 g. Compound 5
6.75 g. PAPI
30.0 g. Xylene and
300 ml. Elvanol
1.32 g. EDA
2.26 g. DETA
2.00 g. Na2CO3
500 ml. Dist. Water The procedure yielded Diazinon payload capsules with a particle size of 10 – 70 microns.

Thus having described the invention, what is claimed is:

1. A phosphorus-containing, solid polymer which is soluble in water and lower alkanols consisting essentially of the interfacial polycondensation reaction product of a chlorocarbonyl-phenyl-dichlorophosphate and hexamethylene diamine or piperazine.

2. A polymer in accordance with claim 1 wherein the chlorocarbonyl-phenyl-dichlorophosphate is 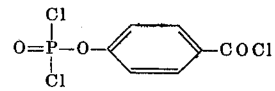 3. A polymer in accordance with claim 1 wherein the polymer is the reaction product of a chlorocarbonyl-phenyl-dichlorophosphate and hexamethylene diamine.

4. A polymer in accordance with claim 1 wherein the polymer is the reaction product of chlorocarbonyl-phenyl-dichlorophosphate and piperazine.

* * * * *